United States Patent [19]
Ban et al.

[11] Patent Number: 4,606,395
[45] Date of Patent: Aug. 19, 1986

[54] METHOD OF PRODUCING FIBER-REINFORCED COMPOSITE MATERIAL

[75] Inventors: Keisuke Ban, Fujimi; Akimasa Daimaru, Oomiya; Yasuo Muraoka, Kawagoe; Noriaki Miyake, Ueda, all of Japan

[73] Assignees: Art Kinzoku Honda Giken Kogyo Kabushiki Kaisha; Kogyo Kabushiki Kaisha, both of Tokyo, Japan

[21] Appl. No.: 318,975

[22] Filed: Nov. 6, 1981

[30] Foreign Application Priority Data

Nov. 6, 1980 [JP] Japan ............................ 55-156386

[51] Int. Cl.$^4$ ............................................. B22D 19/14
[52] U.S. Cl. ............................................. 164/98; 164/97; 164/120; 164/305
[58] Field of Search ............ 164/97, 98, 108, 120, 164/305

[56] References Cited
U.S. PATENT DOCUMENTS 3,349,833 10/1967 Hodler ............................ 164/305

FOREIGN PATENT DOCUMENTS 1949777 10/1970 Fed. Rep. of Germany ........ 164/97
0009132  4/1979 Japan ..................................... 164/97
0471157  8/1975 U.S.S.R. ............................... 164/305

Primary Examiner—Nicholas P. Godici
Assistant Examiner—Richard K. Seidel
Attorney, Agent, or Firm—Armstrong, Nikaido, Marmelstein & Kubovcik

[57] ABSTRACT

A method of producing a fiber-reinforced composite material in which a fiber body is mounted on mounting surfaces in a mold cavity, which mounting surfaces are in fluid communication with the outside of the mold through air relief passages. A molten matrix metal is poured into the mold cavity and then subjected to a high hydrostatic pressure so as to be filled into the fiber body while expelling the air from the fiber body to the outside of the mold through the air relief passages. The molten metal is thereafter filled into the air relief passages and solidifies immediately to seal the mold cavity from the ambient atmosphere whereby the molten matrix in the mold cavity is rapidly solidified under high pressure to form a fiber-reinforced composite material of high quality with inclusion of substantially reduced voids or cavities.

2 Claims, 6 Drawing Figures

METHOD OF PRODUCING FIBER-REINFORCED COMPOSITE MATERIAL

BACKGROUND OF THE INVENTION

1. Field of the Invention

The present invention relates to a method of producing a fiber-reinforced composite material.

2. Description of the Prior Art

The present inventors have already proposed a method of producing a fiber-reinforced composite material which comprises the steps of fixing fiber body in the cavity of a mold, pouring a molten light alloy as the matrix material into the mold cavity, applying a high hydrostatic pressure to the molten metal to fill the fiber body with the molten metal to form a composite material, and rapidly solidifying the fiber-reinforced composite material.

This method, however, has the following disadvantage. During the pouring of the molten light alloy into the mold cavity, the fiber body is surrounded by the molten alloy so that the air in the fiber body is confined therein. Then, as the molten alloy is pressurized to penetrate into and combine with the fiber body, the molten alloy expels the air from the fiber body and disperses it thereinto. However, it is often experienced that depending on the timing of pressurizing the air is not expelled from the fiber body but remain therein to form voids which are not filled with the alloy.

In order to avoid this problem, it is considered to suitably adjust the timing of pressurizing so as to give a preference to the expelling of the air to ensure good dispersion thereof into the molten alloy. Such an adjustment of timing of pressurizing, however, limits or complicates the casting condition undesirably.

SUMMARY OF THE INVENTION

Accordingly, an object of the invention is to provide a method of producing a fiber-reinforced composite material which is capable of expelling the air confined in the fiber body without fail thereby to form a quality product with inclusion of substantially reduced voids or cavities.

According to the present invention, there is provided a method of producing a fiber reinforced composite material comprising the steps of:

(a) mounting a fiber body on mounting surfaces in a cavity of a mold, said mounting surfaces being in fluid communication with the outside of said mold through air relieving means;

(b) pouring a molten matrix metal into said mold cavity;

(c) filling said molten matrix metal into said fiber body under application of a high hydrostatic pressure while expelling the air in said fiber body to the outside of said mold through said air relieving means;

(d) filling said air relieving means with said molten matrix metal;

(e) solidifying said molten matrix in said air relieving means to seal said mold cavity from the ambient atmosphere; and (f) solidifying under high pressure said molten matrix metal in said mold cavity.

The above described method of the invention offers the following advantages.

The air relieving means is not filled or clogged with the molten metal before the fiber body is filled with the molten metal, because, when the molten metal is poured into the mold cavity, the air relieving means is sealed by the fiber body against the entry of the molten metal. It is, therefore, possible to expel and remove the air in the fiber body easily and without fail through the air relieving means in the next step of applying the high pressure to the molten metal for filling and combining the fiber body with the molten metal. Accordingly, a composite material having a fiber-reinforced portion of a fine structure without inclusion of voids or cavities can be obtained.

In addition, the molten metal in the air relieving means solidifies earlier than the molten metal in the mold cavity so as to seal the mold cavity from the ambient atmosphere. This not only eliminates any need for increasing the pressure applied to the molten metal for rapid solidification thereof, but also any troublesome adjustment of timing for pressure application, which is required in the prior art for expelling and dispersing the air from the fiber body, thereby simplifying the casting condition and enabling easier and more efficient production of the fiber-reinforced composite material.

The above and other objects, as well as advantageous features of the invention will become clear from the following description of the preferred embodiments taken in conjunction with the accompanying drawings.

DESCRIPTION OF THE PREFERRED EMBODIMENT

Hereinafter, the invention will be described in detail through a preferred embodiment applied to the production of a connecting rod of internal combustion engine having a fiber-reinforced rod portion, with reference to the accompanying drawings.

Figure 5:
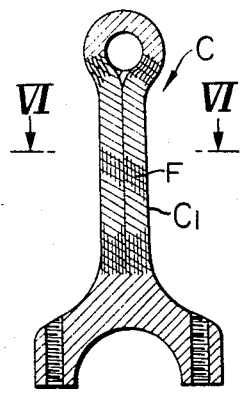
FIG. 5 is a longitudinal sectional view of a connecting rod produced by the method of the invention.
Figure 6:
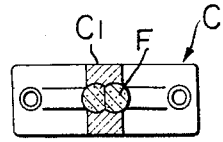
FIG. 6 is a sectional view taken along the line VI—VI of FIG. 5.

Referring to FIGS. 1 to 4, a horizontally split mold 1 consists of an upper mold part 1a and a lower mold part 1b which are adapted to be coupled with each other to form therebetween cavities 2a, 2b corresponding to the configuration of the connecting rod C as shown in FIGS. 5 and 6. Arcuate mounting surfaces 3a, 3b are formed to oppose to each other along both longitudinal edges of those portions of cavities 2a, 2b which correspond to the rod portion $C_1$ of the connecting rod C. Formed in the joint surface of the lower mold part 1b are grooves 4 which extend over a predetermined length in the axial direction of the connecting rod to form slit-like air relief passages S with their opposite ends opening at the mounting surfaces 3a, 3b and to the outside of the mold 1, respectively.

The positions of the air relief passages S are determined taking into account the filling path of the molten metal into the fiber body and the sequence of solidification. More specifically, the air relief passages S are so positioned as to communicate with the portion where the solidification takes place later than other portions.

Figure 1:
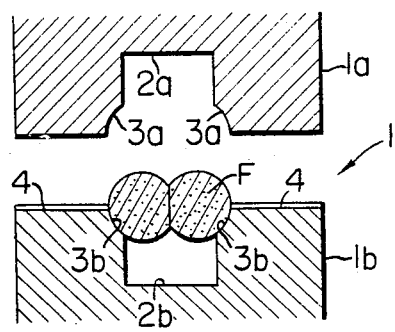
FIGS. 1 to 4 illustrate different steps of the method in accordance with the invention.
Figure 2:
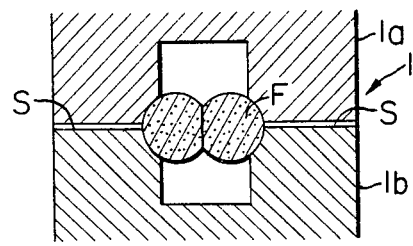
Figure 3:
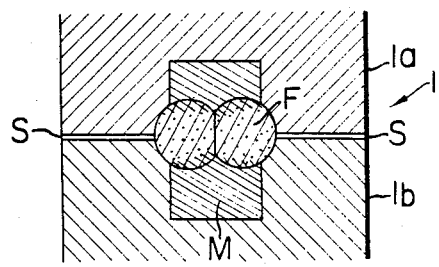
Figure 4:
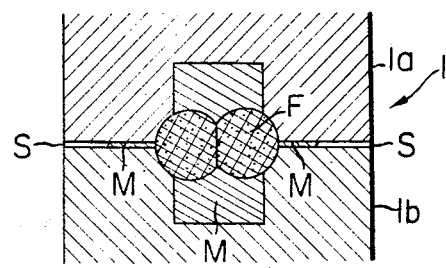

In production of a fiber-reinforced connecting rod, a fiber body F which is made by bundling unidirectional inorganic fibers is laid on the mounting surfaces 3b of the lower mold part 1b as illustrated in FIG. 1. Then, the upper mold part 1a is lowered to be jointed to the lower mold part 1b so that the fiber body F is clamped between the mounting surfaces 3a, 3b as shown in FIG. 2. Subsequently, as shown in FIG. 3, a molten matrix metal M such as a molten aluminum alloy is poured into the mold cavities 2a, 2b. In this stage, the ends of the air relief passages S opening at the mounting surfaces 3a, 3b are closed by the fiber body F so as to prevent the molten metal M from flowing into the air relief passage.

Then, the molten metal M is pressurized to fill into the fiber body F to be combined with the latter while expelling air through the air relief passages S from the minute vacant spaces formed between adjacent fibers in the fiber body F to the outside of the mold. Then, the molten metal M fills the air relief passages S and is promptly solidified therein to interrupt the communication between the mold cavities 2a, 2b and the ambient air. Thereafter, the molten metal M in the cavities 2a, 2b is also solidified rapidly under the application of the high pressure.

The aluminum alloy solidified in the air relief passages S forms fins. By removing these fins, a connecting rod C having a fiber-reinforced rod portion $C_1$ as shown in FIGS. 5 and 6 is obtained.

What is claimed is:

1. A method of producing a fiber-reinforced composite material comprising the steps of:
   (a) mounting a fiber body on mounting surfaces in a cavity of a mold consisting of plural mold parts, said mounting surfaces being in fluid communication with the outside of said mold through air relieving means formed in joint surfaces of said plural mold parts;
   (b) pouring a molten matrix metal into said mold cavity;
   (c) filling said molten matrix metal into said fiber body under application of a high hydrostatic pressure while expelling the air in said fiber body to the outside of said mold through said air relieving means;
   (d) filling said air relieving means with said molten matrix metal;
   (e) solidifying said molten matrix metal in said air relieving means to seal said mold cavity from the ambient atmosphere; and
   (f) solidifying under high pressure said molten matrix metal in said mold cavity.

2. A method as set forth in claim 1, further comprising separating said mold into its plural mold parts, and thereafter removing fins produced in said air relieving means from said solidified metal fiber-reinforced composite.

* * * * *

UNITED STATES PATENT AND TRADEMARK OFFICE
CERTIFICATE OF CORRECTION

PATENT NO. : 4,606,395

DATED : August 19, 1986

INVENTOR(S) : Keisuke BAN et al

It is certified that error appears in the above-identified patent and that said Letters Patent is hereby corrected as shown below:

On the cover page, Item [73], the Assignees should read --Honda Giken Kogyo Kabushiki Kaisha and Art Kinzoku Kogyo Kabushiki Kaisha, both of Tokyo, Japan.--.

Signed and Sealed this

Sixteenth Day of December, 1986

Attest:

DONALD J. QUIGG

*Attesting Officer*  *Commissioner of Patents and Trademarks*